H. FISH.
TOOL HOLDER.
APPLICATION FILED FEB. 24, 1912.

1,056,653.                    Patented Mar. 18, 1913.

Witnesses                        Inventor
                                 Harold Fish.
                              By Attorney
                          Mason Fenwick & Lawrence

UNITED STATES PATENT OFFICE.

HAROLD FISH, OF STRATFORD, CONNECTICUT, ASSIGNOR TO THE READY TOOL COMPANY, OF BRIDGEPORT, CONNECTICUT, A CORPORATION OF CONNECTICUT.

TOOL-HOLDER.

1,056,653.  Specification of Letters Patent.  Patented Mar. 18, 1913.

Application filed February 24, 1912. Serial No. 679,695.

*To all whom it may concern:*

Be it known that I, HAROLD FISH, citizen of the United States, residing at Stratford, in the county of Fairfield and State of Connecticut, have invented certain new and useful Improvements in Tool-Holders; and I do hereby declare the following to be a full, clear, and exact description of the invention, such as will enable others skilled in the art to which it appertains to make and use the same.

This invention relates to tool holders and more particularly to that class used in connection with lathe and shaper work.

An object of this invention is to provide an improved means of gripping a cutting tool in a holder so as to prevent chattering of the tool from displacing the walls of the socket adapted to receive said tool holder.

A further object of my invention is to provide a tool of the usual degree of hardness, so as to cause the same to be tough to stand any vibration without breaking and to insert a piece of harder metal in the walls of the socket formed therein to receive the immediate strain and to distribute said strain uniformly along the lower wall of the socket.

A further object of my invention is to provide a tool holder of metal of one degree of hardness and to insert a separate piece of metal of a further degree of hardness in the bottom of the socket formed in said holder, said inserted piece being so shaped as to distribute the strain received thereon uniformly, so as to prevent rupturing of the tool holder.

Figures 1, 2:
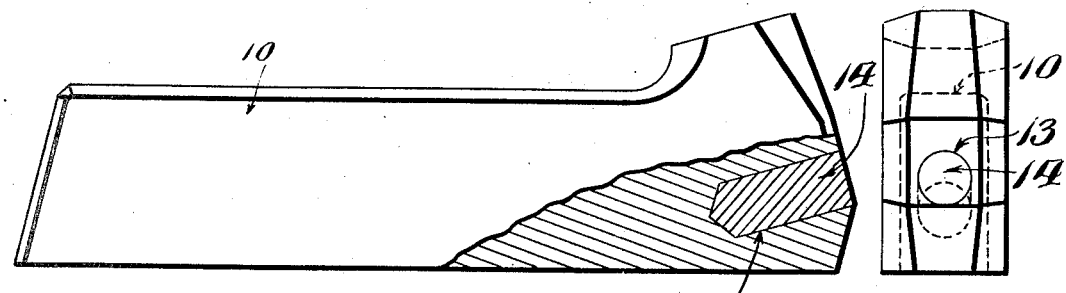
Figures 3, 4:
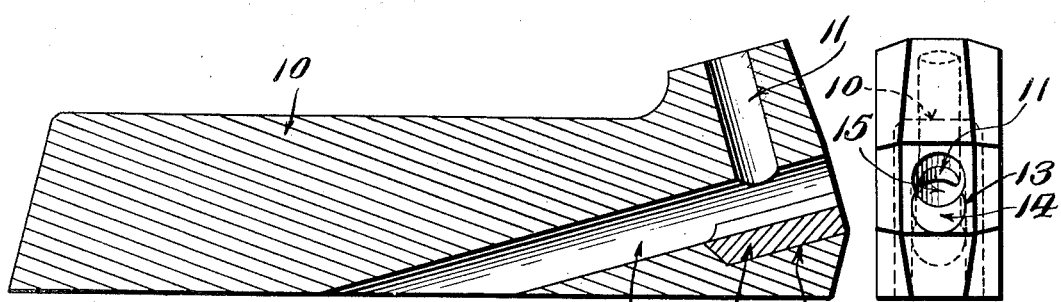
Figures 5, 6:
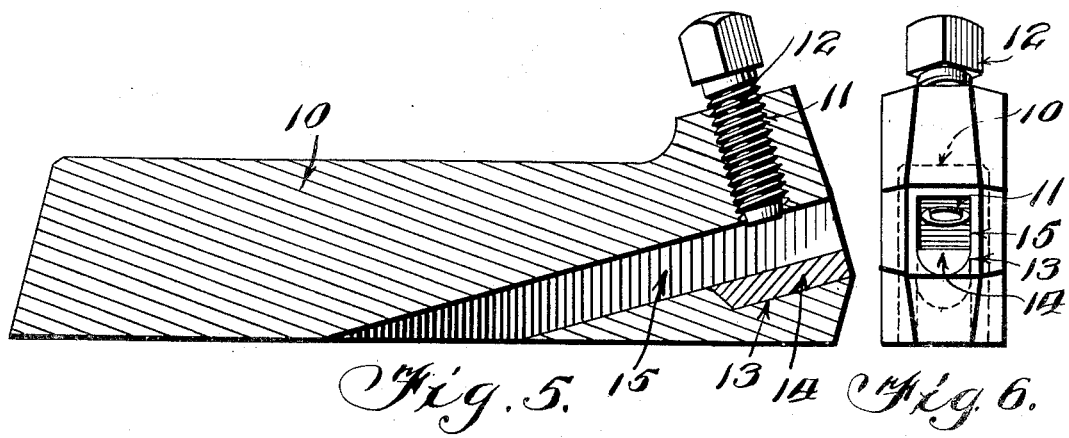

Further objects will be apparent from the following specification, appended claims and drawings, in which, Figure 1 is a sectional view through the tool holder in the first stage of development for the complete article, Fig. 2 is an end elevation thereof, Fig. 3 is a view similar to Fig. 1 in the second stage, Fig. 4 is end elevation of Fig. 3, Fig. 5 is view similar to Fig. 1 in final stage, Fig. 6 is end elevation of Fig. 5.

In the manufacture of tool holders, it is necessary that the body portion of the said holder be made of a tough metal so that it may be securely clamped to a carriage and at the same time stand vibration. After clamping a tool in the socket formed in such a holder, repeated hard usage of the device with shocks received thereby causes the recess eventually to become enlarged or perhaps breaks the metal forming the walls of said recess through its weakest point. In order to provide a device which can stand constant usage, it is necessary that a body portion be provided, which possesses characteristics of a tough but resilient character and that the portion of the socket which receives the strain should be provided of harder metal than the body portion of the holder and that said hardened face should be so inserted, that the strain exerted thereon is distributed uniformly over a greater area and in such a way as to avoid any weak joints which would cause rupturing of the device.

I provide a holder comprising the shank 10 and of the usual configuration of such devices. The forward end of the holder is enlarged and provided with a recess 11 which is internally threaded to receive the set screw 12. In developing the device from the crude to the finished form the hole 13 is drilled in the end thereof and at an inclination as shown in the drawings. A plug 14 of metal considerably harder than the body portion of the holder, is then inserted in hole 14 and welded therein, preferably by the usual electrical process. A second hole 15 is then drilled through the body portion of the holder parallel to the axis of the plug 14, and so positioned therethrough that the circumference thereof passes through the plug 14, removing the upper portion of the plug 14, the circular opening represented by the bore 15 is then changed to a square having walls thereof approximately tangent to the circumference of the bore and is adapted to receive a cutting tool of the common type. By this construction it is evident that the said walls of the socket are of sufficient thickness to stand the strain exerted upon the tool, which strain is later exerted on the lower face of said socket. Then the remaining portion of the plug 14, which in the finished product is substantially semicircular in cross section, receives the strain from the cutting tool and distributes same over an increased area and in such a way as to avoid any severe strain falling on the side walls of the recess at the junction of that portion below the socket.

The inserted piece 14 is shown semicircular in section and in this form is best adapted to receive uninjured the shocks attendant upon the operation of the tool holder and will also have least tendency to crack when in this form. However, I do not restrict myself to the semicircular formation of the inserted piece as said piece may be made non-circular, such as hexagonal or the like and

Having thus described my invention, I claim:

1. In a tool holder, a body of a desired tenacity having a socket formed therein, a piece of harder metal inserted and rigidly secured in said body as to form a wall of said socket to receive the strain.

2. In a tool holder, a body portion of the desired tenacity and shape having a socket formed therein, a second piece of harder and denser metal inserted and rigidly secured in said body portion, said inserted portio forming a portion of the walls of said socket, a set screw carried by said body portion and entering the socket formed in said body portion opposite to the inserted and rigidly secured piece.

In testimony whereof I affix my signature in presence of two witnesses.

HAROLD FISH.

Witnesses:
 Thos. Fish,
 Olga A. Raven.